US 6,670,210 B2

(12) United States Patent
Johannessen

(10) Patent No.: US 6,670,210 B2
(45) Date of Patent: Dec. 30, 2003

(54) OPTICAL WAVEGUIDE WITH LAYERED CORE AND METHODS OF MANUFACTURE THEREOF

(75) Inventor: Kjetil Johannessen, Trondheim (NO)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/136,729

(22) Filed: May 1, 2002

(65) Prior Publication Data

US 2003/0207483 A1 Nov. 6, 2003

(51) Int. Cl.$^7$ ................................................ H01L 21/00
(52) U.S. Cl. ............................... 438/31; 438/16; 385/1; 385/12; 385/13; 385/142; 372/73.1; 372/480
(58) Field of Search .................... 438/16, 31; 372/73.1, 372/480; 385/1, 12, 13, 142

(56) References Cited

U.S. PATENT DOCUMENTS

| | | | |
|---|---|---|---|
| 4,420,873 A | 12/1983 | Leonberger et al. | |
| 4,518,219 A | 5/1985 | Leonberger et al. | |
| 5,436,991 A | 7/1995 | Sunagawa et al. | |
| 5,465,860 A | 11/1995 | Fujimoto et al. | |
| 5,540,346 A | 7/1996 | Fujimoto et al. | |
| 5,732,179 A | * 3/1998 | Caneau et al. ............... | 385/131 |
| 5,825,047 A | 10/1998 | Ajisawa et al. | |
| 5,917,980 A | 6/1999 | Yoshimura et al. | |
| 5,943,465 A | 8/1999 | Kawaguchi et al. | |
| 5,961,924 A | * 10/1999 | Reichert et al. ......... | 422/82.11 |
| 6,075,908 A | 6/2000 | Paniccia et al. | |
| 6,083,843 A | 7/2000 | Ohja et al. | |
| 6,147,366 A | 11/2000 | Drottar et al. | |
| 6,166,846 A | 12/2000 | Maloney | |
| 6,178,281 B1 | 1/2001 | Sautter et al. | |
| 6,195,478 B1 | 2/2001 | Fouquet | |
| 6,215,577 B1 | 4/2001 | Koehl et al. | |
| 6,268,953 B1 | 7/2001 | Maloney | |
| 6,269,199 B1 | 7/2001 | Maloney | |
| 6,304,706 B1 | 10/2001 | Sugita et al. | |
| 6,501,895 B1 | * 12/2002 | Bloechl et al. ............. | 385/129 |
| 2002/0132386 A1 | * 9/2002 | Bazylenko ................... | 438/31 |

OTHER PUBLICATIONS

Ayazi et al., "High aspect–ratio polysilicon micromachining technology," Sensors and Actuators 87 (2000) 46–51.
Denisse et al., "Plasma–enhanced growth and composition of silicon oxynitride films," J. Appl. Phys. 60 (7), Oct. 1, 1986, pp. 2536–2542.
Eldada et al., "Thermooptic Planar Polymer Bragg Grating OADM's with Broad Tuning Range," IEEE Photonics Technology Letters, vol. 11, No. 4, Apr. 1999, pp. 448–450.
Fardad et al., "UV–light imprinted Bragg grating in sol–gel ridge glass waveguide with almost 100% reflectivity," Electronics Letters, Jun. 5, 1997, vol. 33, No. 12. pp. 1069–1070.
Giles, "Lightwave Applications of Fiber Bragg Gratings," Journal of Lightwave Technology, vol. 15, No. 8, Aug. 1997, pp. 1391–1403.
Goh et al., "High–Extinction Ratio and Low–Loss Silica-Based 8×8 Strictly Nonblocking Thermooptic Matrix Switch," Journal of Lightwave Technology, vol. 17, No. 7, Jul. 1999, pp. 1192–1199.

(List continued on next page.)

*Primary Examiner*—Long Pham
*Assistant Examiner*—Wai-Sing Louie
(74) *Attorney, Agent, or Firm*—Marshall, Gerstein & Borun LLP

(57) ABSTRACT

A semiconductor waveguide is disclosed which includes a substrate coated with a cladding. A core is embedded in the cladding. The core includes a plurality of discreet stacked layers of core material surrounded by cladding material. The cladding and core layers each include silica and silicon nitride with the core layers having a higher nitrogen content than the cladding material. The core is fabricated by carefully manipulating the process parameters of a PECVD process.

21 Claims, 3 Drawing Sheets

OTHER PUBLICATIONS

Hibino et al., "Temperature–insensitive UV–induced Bragg gratings in silica–based planar lightwave circuits on Si," Electronics Letters, Oct. 14, 1999, vol. 35, No. 21, pp. 1844–1845.

Itoh et al., "Low–Loss 1.5% Δ Arrayed Waveguide Grating with Spot–Size Converters," NTT Photonics Laboratories, 2 pages.

Kashyap et al., "Laser–Trimmed Four–Port Bandpass Filter Fabricated in Single–Mode Photosensitive Ge–Doped Planar Waveguide," IEEE Photonics Technology Letters, vol. 5, No. 2, Feb. 1993, pp. 191–194.

Kitagawa et al., "Single–frequency $Er^{3+}$–doped silica–based planar waveguide laser with integrated photo–imprinted Bragg reflectors," Electronics Letters, Aug. 4, 1994, vol. 30, No. 16, pp. 1311–1312.

Kohnke et al, "Planar waveguide Mach–Zender bandpass filter fabricated with single exposure UV–induced gratings," OFC '96 Technical Digest, p. 277.

Mahorowala et al., "In Situ Measurement of RIE Lag during Polysilicon Etching in a Lam TCP using Full Waver Interferometry," http://www.plasma–processing.com/insitu.htm, 12 pages.

Maxwell et al., "UV Written 13 dB Reflection Filters in Hydrogenated Low Loss Planar Silica Waveguides," Electronics Letters, Mar. 4, 1993, vol. 29, No. 5, pp. 425–426.

Miya et al., "Silica–Based Planar Lightwave Circuits: Passive and Thermally Active Devices," IEEE Journal of Selected Topics in Quantum Elecrtronics, vol. 6, No. 1, Jan./Feb. 2000, pp. 38–45.

Moerman et al., "A Review on Fabrication Technologies for the Monolithic Integration of Tapers with III–V Semiconductor Devices," IEEE Journal of Selected Topics in Quantum Electronics, vol. 3, No. 6, Dec. 1997, pp. 1308–1320.

Okamoto, "Bringing Telecom Networks up to Speed," Circuits and Devices, Sep. 1998, pp. 26–34.

Singh et al., "Apodized Fiber Gratings for DWDM Using Variable Efficiency Phase Masks," pp. 76–77.

Takahashi et al., "A 2.5 Gb/s, 4–Channel Multiwavelength Light Source composed of UV Written Waveguide Gratings and Laser Diodes Integrated on Si," ECOC 97, Sep. 22–25, 1997, pp. 355–358.

Westerheim et al., "Substrate bias effects in high–aspect–ratio $SiO_2$ contact etching using an inductively coupled plasma reactor," J. Vac. Sci. Technol. A 13(3), May/Jun. 1995, pp. 853–858.

White, "Integrated Components for Optical Add/Drop," 29 pages.

Yonemura et al., "Session FT3—Inductively Coupled Plasmas I.," http://www.aps.org/BAPSGEC98/abs/S2000.html, 4 pages.

* cited by examiner

OPTICAL WAVEGUIDE WITH LAYERED CORE AND METHODS OF MANUFACTURE THEREOF

TECHNICAL FIELD

Semiconductor opto-electronic devices including semiconductor optical waveguides and methods of manufacture thereof are disclosed.

BACKGROUND OF THE RELATED ART

There is a wide-ranging demand for increased communications capabilities, including more channels and greater bandwidth per channel. The needs range from long distance applications such as telecommunications between two cities to extremely short range applications such as the data-communications between two functional blocks (fubs) in a semiconductor circuit with spacing on the order of a hundred microns.

Optical fibers can carry information encoded as optical pulses over long distances. The advantages of optical media include vastly increased data rates, lower transmission losses, lower basic cost of materials, smaller cable sizes, and almost complete immunity from stray electrical fields. Other applications for optical fibers include guiding light to awkward places (e.g., surgical applications), image guiding for remote viewing, and various sensing applications.

Optical fibers or waveguides provide an economical and higher bandwidth alternative to electrical conductors for communications. A typical optical fiber includes a silica core, a silica cladding, and a protective coating. The index of refraction of the core is higher than the index of refraction of the cladding to promote internal reflection of light propagating down the silica core.

Waveguides have been developed comprising a mixture of silica ($SiO_2$) and silicon nitride ($Si_3N_4$), often referred to as SiON. The indexes of refraction of the core and cladding can be controlled by controlling the nitrogen content. That is, the nitrogen content of the core will be higher than that of the cladding to give the core a suitably higher index of refraction than the cladding.

However, the differences in the index of refraction of the core and cladding also result in birefringence, or the separation of the light pulse or ray into two unequally refracted pulses or rays. As a result, part of the light transmission is lost. For fiber optic communication systems where long range fiber optic communication is utilized, there is a need for optical and electro-optic devices that are substantially free from birefringence.

In general, birefringence is the difference between a refractive index $n_{TM}$ for the TM mode having a field component perpendicular to the substrate and a refractive index $n_{TE}$ for the TE mode having a field component parallel to the substrate, or, the birefringence equals $n_{TM}$-$n_{TE}$.

The majority of fiber optic telecommunications systems use standard single-mode silica fiber that does not preserve the polarization of the transmitted light. For such systems, the polarization state of the light signal in the optical fiber at any point and at any time is unknown and subject to variation over time and distance as a result of environmental and other changes that occur along the transmission path of the signal. If devices placed at any point in the fiber transmission path or at its end have response characteristics that depend on the polarization state of the light (i.e., polarization dependence), the signal may be degraded or lost altogether.

As integrated optical and electro-optical devices are employed in fiber optic systems for which the polarization state of the light signal is unknown, a need arises to circumvent or minimize the consequences of the polarization dependence and birefringence of these devices.

The most popular approach for reducing the effects of birefringence has been to introduce additional components to control the state of polarization of the light signal before its introduction to the polarization-sensitive device.

A more satisfactory approach would be to provide a waveguide device with a small polarization dependence and birefringence thereby causing only negligible transmission degradation.

DETAILED DESCRIPTION OF THE PRESENTLY PREFERRED EMBODIMENTS

Figure 1:
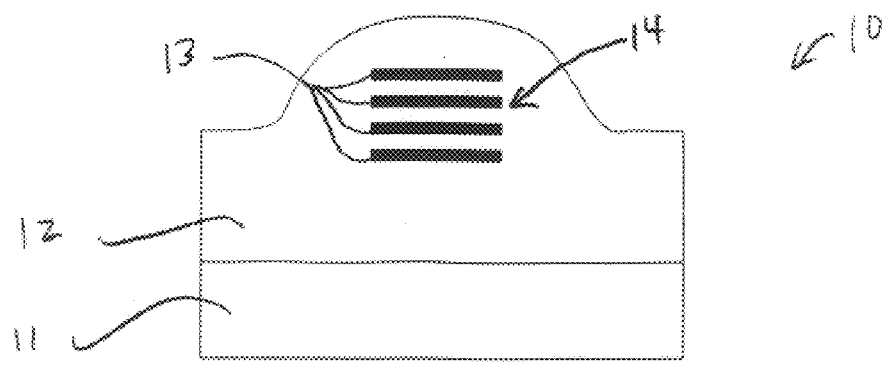
FIG. 1 is a sectional view of a fiber optic waveguide made in accordance with this disclosure.

To provide an optical waveguide and other opto-electronic devices with reduced birefringence and reduced polarization dependence, waveguide and devices are made from binary systems of silica and silicon nitride. Using a plasma enhanced chemical vapor deposition (PECVD) process, a waveguide 10 having the structure illustrated in FIG. 1 is fabricated. The waveguide 10 includes a substrate 11 and a cladding 12. Embedded in the cladding 12 is a series of discreet layers 13 that form a core 14. Both the cladding 12 and the layers 13 of the core 14 comprise both silica and silicon nitride, or SiON. However, the cladding layer 12 has a lower nitrogen content that the discreet stacked layers 13 of the core 14. In the alternative, it is noted that the cladding 12 has a higher oxygen content than the discreet stacked layers 13 of the core 14.

Figure 2:
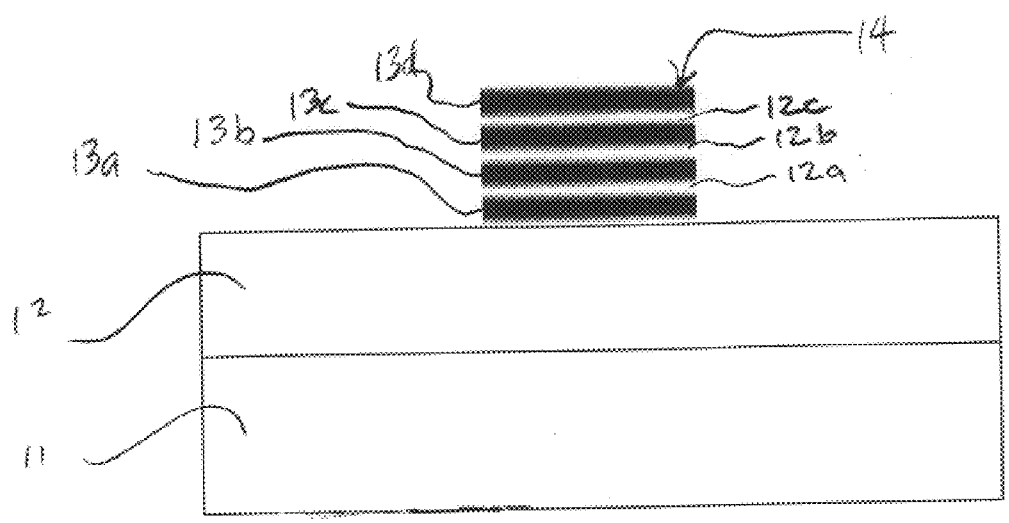
FIG. 2 is a sectional of a substrate, coated with a cladding layer and a plurality of alternating core and cladding layers to form a stacked core in accordance with this disclosure after the core has been etched.
Figure 3:
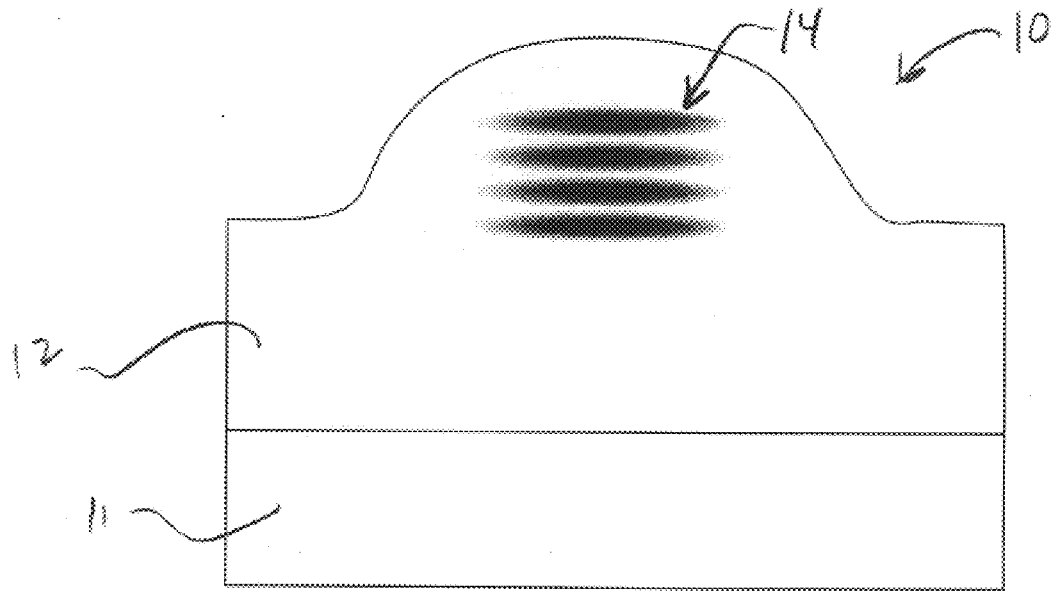
FIG. 3 is a sectional view of a waveguide manufactured in accordance with this disclosure after a cladding layer is been deposited on top of the stacked core and after the structure has been annealed to cause the stacked layers of the core to interdiffuse thereby reducing scattering caused by edge wall index perturbation.

To fabricate the waveguide 10 of FIG. 1, a cladding layer 12 is deposited on a substrate 11, preferably using a PECVD process using silane, nitrous oxide and either ammonia or nitrogen as precursor gases fed to a chamber. To maintain an appropriate nitrogen content in the cladding layer 12, a predetermined flow rate of the ammonia or nitrogen is utilized. Then, to deposit an initial core layer 13a (see FIG. 2), the flow rate of the nitrogen or ammonia is increased to generate a core layer 13a. After a sufficient first core layer 13a is deposited, the nitrogen or ammonia flow rate is reduced to provide a cladding layer 12a disposed on top of the core layer 13a. Then, the nitrogen or ammonia flow rate is again increased to produce the second core layer 13b. This sequence is repeated to form the layers 12b, 13c, 12c and 13d. Then, using a masking layer, the core 14 is etched. Then, as shown in FIG. 3, additional cladding material is deposited on top of the core 14. The materials for the cladding 12 and core layers 13 are deposited at moderate temperatures ranging from about 450° C. to about 800° C. or possibly higher, depending upon the reactor used.

The entire structure is then annealed to provide the interlayer diffusion illustrated in FIG. 3. The temperature of the anneal process will typically range from about 1000° C. to about 1300° C., more preferably at the lower end of this range, from about 1000° C. to about 1100° C. It will be noted that only small differences in the nitrogen content (or the oxygen content) the cladding 12 and core layers 13 are required in order to generate a sufficient index of a refraction. Specifically, the relatively steep slope of the refractive index illustrated in FIG. 6 for a $SiO_2$—$Si_3N_4$ system establishes this proposition.

Figure 4:
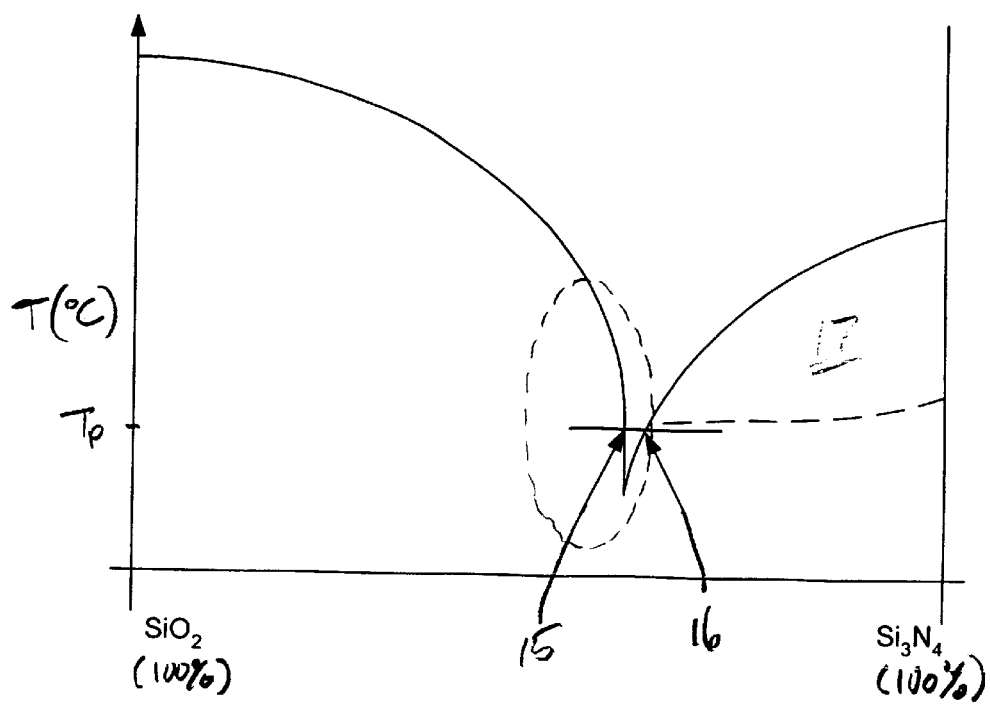
FIG. 4 is a phase diagram for a binary $SiO_2$—$Si_3N_4$ system illustrated in the use of a lower process temperature for a PECVD process for generating the stacked layer core structure illustrated in FIGS. 1–3.

Turning to FIG. 4, it is evident that a single process temperature can be utilized for the deposition of the silica rich cladding layer 12 and the silicon nitride rich core layers 13. Specifically, points 15 and 16 of FIG. 4 fall outside of the region 17 of reported crystallization in the silicon nitride. Further, by maintaining the constant process temperature Tp during the cladding 12 and core layer 13 depositions, and the subsequent annealing, the flow temperatures of the cladding 12 and core layers 13 match which will reduce sidewall roughness of the core 14. Specifically, the core layers 13 and cladding 12 will soften and flow at the same temperature, and as a result, intermixing and interdiffusion will occur.

In contrast, when strong intermixing and interdiffusion does not occur, there will be a natural surface tension forming between two crystallized materials. Therefore, the simultaneous flow will induce a straightening of the interface between the two materials thereby reducing sidewall roughness. By maintaining the process temperature constant during the deposition of the cladding 12 and core layers 13, surface tension between the two materials is reduced thereby reducing the stressinduced birefringence.

Figure 5:
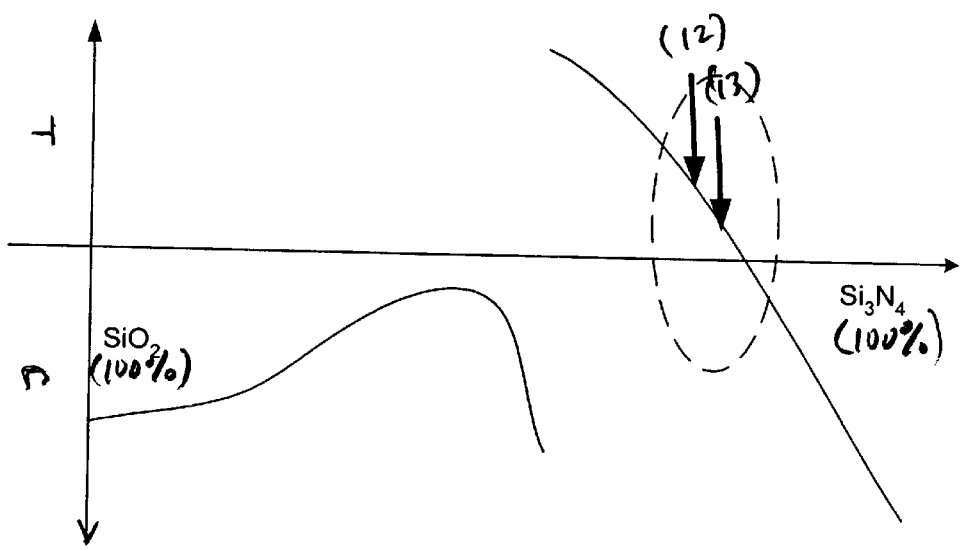
FIG. 5 illustrates, graphically, the tensile and compressive forces for a binary $SiO_2$—$Si_3N_4$ system.
Figure 6:
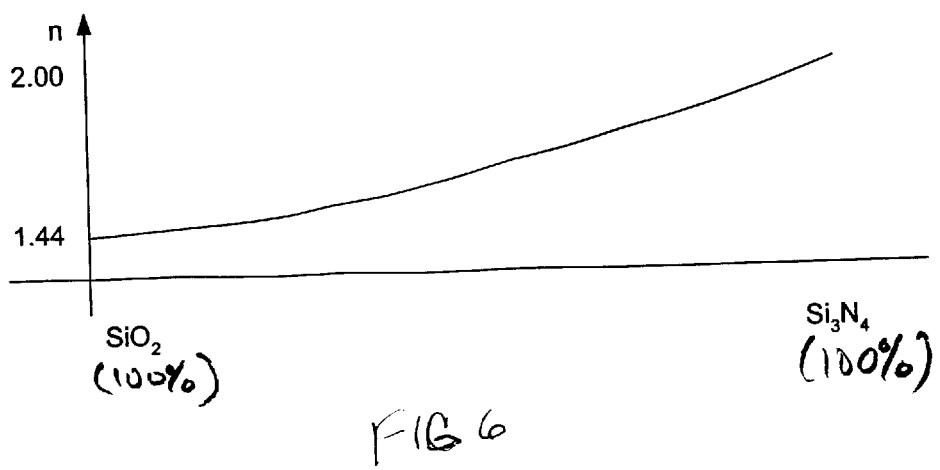
FIG. 6 illustrates, graphically, the index of refraction for various $SiO_2Si_3N_4$ binary systems.

Further, as illustrated in FIG. 5, moderate stress will be indicated from two similar compositions used for the cladding 12 and core layers 13. However, the tensile stress illustrated in FIG. 5 can be used to compensate for polarization dependence. Specifically, [refractive index difference] the layering birefringence caused by the stacked layers 13 can be used to compensate for stressed induced birefringence if the composition of the cladding 12 and core layers 13 are appropriately chosen using the data in FIG. 5. FIG. 6 illustrates that two materials of such a similar composition still exhibit suitable refractive index differences and the relatively small refractive index differences combined with the induce stress results in polarization dependence compensation.

The differences in nitrogen content and oxygen content of the cladding 12 and core layers 13 will depend upon the surface area of the structure. Using the fraction x for $SiO_2$ content in the cladding and y for $Si_3N_4$ content in the cladding where x+y=1. when the surface area of the cladding 12 is about 1×1 $\mu$m, the $Si_3N_4$ content of the core layers 13 should exceed the $Si_3N_4$ content of the cladding 12 by 0.1 to about 0.2. In contrast, when the surface area of the cladding is about 3×3 $\mu$m, the $Si_3N_4$ content of the core layers 13 should exceed the $Si_3N_4$ content of the cladding 12 by 0.03 to 0.05. When the surface area of the cladding 12 is about 6×6 $\mu$m, the $Si_3N_4$ content of the layers 13 of the core 14 should exceed the $Si_3N_4$ content of the cladding 12 by about 0.01 to about 0.03. In other words, the larger the surface area of the cladding 12, a lower difference in $Si_3N_4$ content between the cladding 12 and core layers 13 is required. The same is also true for $SiO_2$ content.

In the foregoing detailed description, the disclosed structures and methods have been described with reference exemplary embodiments. It will, however, be evident that various modifications and changes may be made thereto without departing from the broader spirit and scope of this disclosure. The above specification and figures are to be regarded as illustrative, rather than restrictive. Particular materials selected herein can easily be substituted for other materials that will be apparent to those skilled in the art and would nevertheless remain equivalent embodiments of the disclosed structures and methods.

What is claimed:

1. A method of fabricating an optical waveguide, the method comprising:

(a) coating a substrate with a cladding material comprising $SiO_2$ and $Si_3N_4$ by a PECVD process using $SiH_4$, $N_2O$ and a nitrogen-containing gas selected from $NH_3$ and $N_2$ as precursor gases fed to a chamber housing the substrate and with a first nitrogen-containing gas flow rate, (b) coating a layer of core material on the cladding using the PECVD process with $SiH_4$, $N_2O$ and the nitrogen-containing gas selected from $NH_3$ and $N_2$ as precursor gases but at a second nitrogen-containing gas flow rate that is less than the first nitrogen-containing gas flow rate, (c) coating a cladding material layer on the layer of core material using the PECVD process using $SiH_4$, $N_2O$ and the nitrogen-containing gas selected from $NH_3$ and $N_2$ as precursor gases but at a third nitrogen-containing gas flow rate that is greater than the second nitrogen-containing gas flow rate, (d) repeating steps (b) and (c) to produce alternating layers of cladding material and core material, (e) etching the alternating layers of core material and cladding material to from an optical waveguide core, (f) coating the optical waveguide core with cladding material.

2. The method of claim 1 wherein steps (b) and (c) are carried out at essentially identical temperatures below the crystallization temperatures for $SiO_2$ and $Si_3N_4$ in a binary $SiO_2$ and $Si_3N_4$ system but above the eutectic point for the binary $SiO_2$ and $Si_3N_4$ system.

3. The method of claim 2 further comprising an annealing step carried out at a temperature ranging from about 1000° C. to about 1300° C. after step (f).

4. The method of claim 3 wherein the annealing temperature ranges from about 1000° C. to about 1100° C.

5. The method of claim 1 wherein a stress is present at interfaces between each layer of core material and surrounding cladding to create a stress polarization effect at each layer, the combined stress effects of the layers of core material acting to at least partially cancel each other out to reduce polarization dependence of the waveguide.

6. The method of claim 1 wherein the first and third nitrogen-containing gas flow rates are substantially the same.

7. The method of claim 1 wherein the nitrogen-containing gas is $NH_3$.

8. The method of claim 1 wherein the nitrogen-containing gas is $N_2$.

9. A method of fabricating an optical waveguide with reduced polarization dependence, the method comprising:

(a) coating a substrate with a cladding material comprising $SiO_2$ and $Si_3N_4$ by a PECVD process using $SiH_4$, $N_2O$ and a nitrogen-containing gas selected from $NH_3$ and $N_2$ as precursor gases fed to a chamber housing the substrate and with a first nitrogen-containing gas flow rate, (b) coating a layer of core material on the cladding using the PECVD process with $SiH_4$, $N_2O$ and the nitrogen-containing gas as precursor gases but at a second nitrogen-containing gas flow rate that is less than the first nitrogen-containing gas flow rate and at a temperature so as to induce a stress between the layer of core material and underlying cladding, (c) coating a cladding material layer on the layer of core material using the PECVD process using $SiH_4$, $N_2O$ and the nitrogen-containing gas as precursor gases but at a third nitrogen-containing gas flow rate that is greater than the second nitrogen-containing gas flow rate and at a temperature so as to induce a stress between the cladding material layer and the underlying layer of core material, (d) repeating steps (b) and (c) to produce alternating layers of cladding material and core material, (e) etching the alternating layers of core material and cladding material to form an optical waveguide core, (f) coating the optical waveguide core with cladding material.

10. The method of claim 9 further comprising an annealing step carried out at a temperature ranging from about 1000° C. to about 1300° C. after step (f).

11. The method of claim 10 wherein the annealing temperature ranges from about 1000° C. to about 1100° C.

12. The method of claim 9 wherein the first and third nitrogen-containing gas flow rates are substantially the same.

13. A method of fabricating an optical waveguide comprising a core embedded in a cladding with reduced roughness along sidewalls of the core, the method comprising:

(a) coating a substrate with a cladding material comprising $SiO_2$ and $Si_3N_4$ by a PECVD process using $SiH_4$, $N_2O$ and a nitrogen-containing gas selected from $NH_3$ and $N_2$ as precursor gases fed to a chamber housing the substrate and with a first nitrogen-containing gas flow rate, (b) coating a layer of core material on the cladding using the PECVD process with $SIH_4$, $N_2O$ and the nitrogen-containing gas as precursor gases but at a second nitrogen-containing gas flow rate that is less than the first nitrogen-containing gas flow rate, (c) coating a cladding material layer on the layer of core material using the PECVD process using $SiH_4$, $N_2O$ and nitrogen-containing gas as precursor gases but at a third nitrogen-containing gas flow rate that is greater than the second nitrogen-containing gas flow rate, wherein steps (b) and (c) are carried out at essentially identical temperatures below the crystallization temperatures for $SiO_2$ and $Si_3N_4$ in a binary $SiO_2$ and $Si_3N_4$ system but above the eutectic point for the binary $SiO_2$ and $Si_3N_4$ system, (d) repeating steps (b) and (c) to produce alternating layers of cladding material and core material, (e) etching the alternating layers of core material and cladding material to form an optical waveguide core, (f) coating the optical waveguide core with cladding material.

14. The method of claim 13 further comprising an annealing step carried out at a temperature ranging from about 1000° C. to about 1300° C. after step (f).

15. The method of claim 14 wherein the annealing temperature ranges from about 1000° C. to about 1300° C.

16. The method of claim 13 further comprising an annealing step carried out at a temperature ranging from about 1000° C. to about 1300° C. between steps (b) and (c).

17. The method of claim 16 wherein the annealing temperature ranges from about 1000° to about 1100° C.

18. The method of claim 13 wherein a stress is present at interfaces between each layer of core material and surrounding cladding to create a stress polarization effect at each layer, the combined stress effects of the layers of core material acting to at least partially cancel each other out to reduce polarization dependence of the waveguide.

19. The method of claim 18 wherein the first and third nitrogen-containing gas flow rates are substantially the same.

20. The method of claim 13 wherein the nitrogen-containing gas is $NH_3$.

21. The method of claim 13 wherein the nitrogen-containing gas is $N_2$.

* * * * *